United States Patent
Ayrapetian et al.

(10) Patent No.: US 9,246,545 B1
(45) Date of Patent: Jan. 26, 2016

(54) ADAPTIVE ESTIMATION OF DELAY IN AUDIO SYSTEMS

(71) Applicant: Amazon Technologies, Inc., Seattle, WA (US)

(72) Inventors: Robert Ayrapetian, Morgan Hill, CA (US); Yuwen Su, Cupertino, CA (US); Arnaud Jean-Louis Charton, Livermore, CA (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 14/251,393

(22) Filed: Apr. 11, 2014

(51) Int. Cl.
*H04B 3/20* (2006.01)
*H04B 3/23* (2006.01)
*H04M 9/08* (2006.01)
*G10K 11/178* (2006.01)

(52) U.S. Cl.
CPC .............. *H04B 3/23* (2013.01); *G10K 11/1784* (2013.01); *G10K 11/1788* (2013.01); *H04M 9/082* (2013.01)

(58) Field of Classification Search
None
See application file for complete search history.

(56) References Cited

U.S. PATENT DOCUMENTS

| 2008/0037451 | A1* | 2/2008 | Yagunov | H04M 9/082 370/289 |
| 2015/0146878 | A1* | 5/2015 | Meredith | G10K 11/178 381/71.6 |
| 2015/0163346 | A1* | 6/2015 | Adams | H04M 3/002 379/406.08 |

* cited by examiner

*Primary Examiner* — Muhammad N Edun
(74) *Attorney, Agent, or Firm* — Knobbe, Martens, Olson & Bear, LLP

(57) ABSTRACT

Features are disclosed for adaptively estimating propagation delay in an audio system. A first device in communication with a speaker may be configured produce sound based on an audio playback signal. A second device in communication with one or more microphones may be configured to detect sound as a microphone signal. The second device may perform acoustic echo cancellation using a first propagation delay parameter and determine a first echo return loss enhancement. The second device may perform acoustic echo cancellation using a second propagation delay parameter and determine a second echo return loss enhancement. A propagation delay between the audio playback signal and the microphone signal may be adaptively estimated based on a comparison of the first and second echo return loss enhancements.

20 Claims, 4 Drawing Sheets

ADAPTIVE ESTIMATION OF DELAY IN AUDIO SYSTEMS

BACKGROUND

A system for bi-directional audio-based communication may include a loudspeaker and one or more microphones. The loudspeaker is used to play back audio signals received from a remote ("far-end") source, while the microphone is used to capture audio signals from a local ("near-end") source. In the case of a voice-controlled audio playback system, for example, the far-end source may include video content from a network source or a disk, and the near-end source may include a viewer's speech commands. As another example, in the case of a telephone call, the near- and far-end sources may be people engaged in a conversation, and the audio signals may contain speech. An acoustic echo occurs when the far-end signal emitted by the loudspeaker is captured by the microphone, after undergoing reflections in the local environment.

An acoustic echo canceller ("AEC") may be used to remove acoustic echo from an audio signal captured by a microphone in order to facilitate improved communication. For example, the AEC may filter the microphone signal by determining an estimate of the acoustic echo (e.g., the remote audio signal emitted from the loudspeaker and reflected in the local environment). The AEC can then subtract the estimate from the microphone signal to produce an approximation of the true local signal (e.g., the user's utterance). The estimate can be obtained by applying a transformation to a reference signal that corresponds to the remote signal emitted from the loudspeaker. In addition, the transformation can be implemented using an adaptive algorithm. For example, adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC to can adapt its echo estimates to the local environment in which it operates.

Propagation delay is a problem in audio communication devices. Propagation delay results from a time delay between when a loudspeaker device sends an audio playback signal to the loudspeaker for playback and when a microphone signal is received by a microphone device. If an acoustic echo canceller is informed of the propagation delay, it can align the playback signal with the microphone signal before performing echo cancellation. If an acoustic echo canceller is not informed of the propagation delay, or if the estimate of the propagation delay is incorrect, the acoustic echo canceller will not be able to align the playback signal with the microphone signal, and performance of the acoustic echo canceller will suffer.

When the microphone is in a constant position relative to the loudspeaker, the propagation delay remains constant. However, if the microphone is moved, the propagation delay may change. The offset caused by propagation delay can severely inhibit the effectiveness of the acoustic echo canceller, which may inhibit speech recognition. Accordingly, there is a need to adaptively measure and correct propagation delay in audio communication systems.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Generally described, the present disclosure relates to adaptively estimating propagation delay in an audio communication system. In some embodiments, this may be accomplished by performing acoustic echo cancellation using various propagation delay parameters, measuring the echo return loss enhancement corresponding to each propagation delay parameter, and selecting a propagation delay corresponding to a maximum echo return loss enhancement. For example, a first device in communication with a speaker may be configured produce sound based on an audio playback signal. A second device in communication with one or more microphones may be configured to receive sound as a microphone signal. If there is a distance between the speaker and the one or more microphones, there will be a propagation delay between when the audio playback signal is played and when the microphone signal is received. The second device may perform acoustic echo cancellation using a first propagation delay parameter and determine a first echo return loss enhancement. The second device also may perform acoustic echo cancellation using a second propagation delay parameter and determine a second echo return loss enhancement. A propagation delay between the audio playback signal and the microphone signal may be adaptively estimated based on a comparison of the first and second echo return loss enhancements. For example, propagation delay may be estimated as the propagation delay parameter corresponding to the largest echo return loss enhancement. The first and second propagation delay parameters may be continuously updated and corresponding echo return loss enhancement recalculated to adaptively estimate propagation delay.

Audio Communication System Environment

Figure 1:
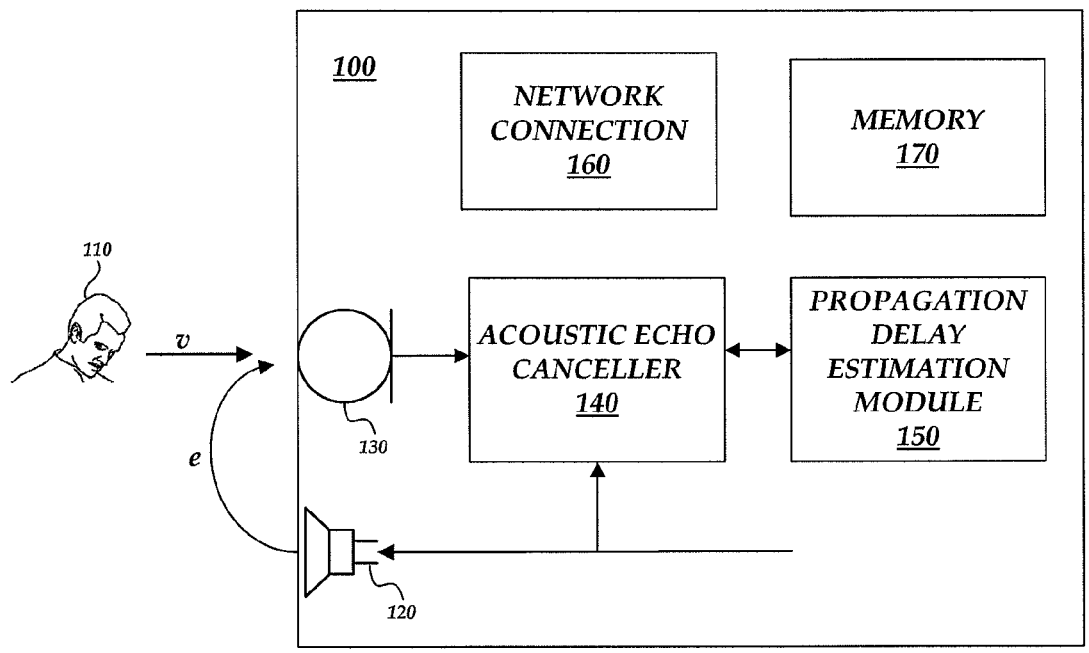
FIG. 1 is a block diagram illustrating some components of an audio communication system.

FIG. 1 shows an example of an audio communication system 100. Audio communication system 100 may be implemented in hardware and/or software using techniques known to persons of skill in the art. For example, communication system 100 may be implemented by a single telecommunication device, such as a mobile phone, or by a combination of several devices, including an entertainment system, a video game system, a mobile computing device, and a network-accessible server.

FIG. 1 shows components that may appear in an audio communication system 100, including a loudspeaker 120, a microphone 130, an acoustic echo canceller 140, a propagation delay estimation module 150, a network connection 160, and a memory 170. Although shown as a single audio communication system 100, each of the loudspeaker 120, microphone 130, acoustic echo canceller 140, propagation delay estimation module 150, network connection 160, and memory 170 may be distinct, physically-separate components. When user 110 speaks an utterance, the user's voice v may be detected by the microphone 130. In addition, the speaker 120 may produce sound based on an audio playback signal, creating an acoustic echo e that is detected by the microphone 130. Thus, an audio input signal detected by the microphone 130 may include components attributable to the user's voice v and the acoustic echo e.

Network connection 160 may be used to send and receive communication signals over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

The communication signals that are sent and received by network connection 160 may include a far-end signal, which may be emitted from loudspeaker 120, and an AEC output signal, produced by acoustic echo canceller 140. For the sake of simplicity, microphone 130 may be referred to herein as a single component. However, in some embodiments, multiple microphones may be used together and an AEC system (or portions of an AEC system) may be provided for each one.

Figure 2:
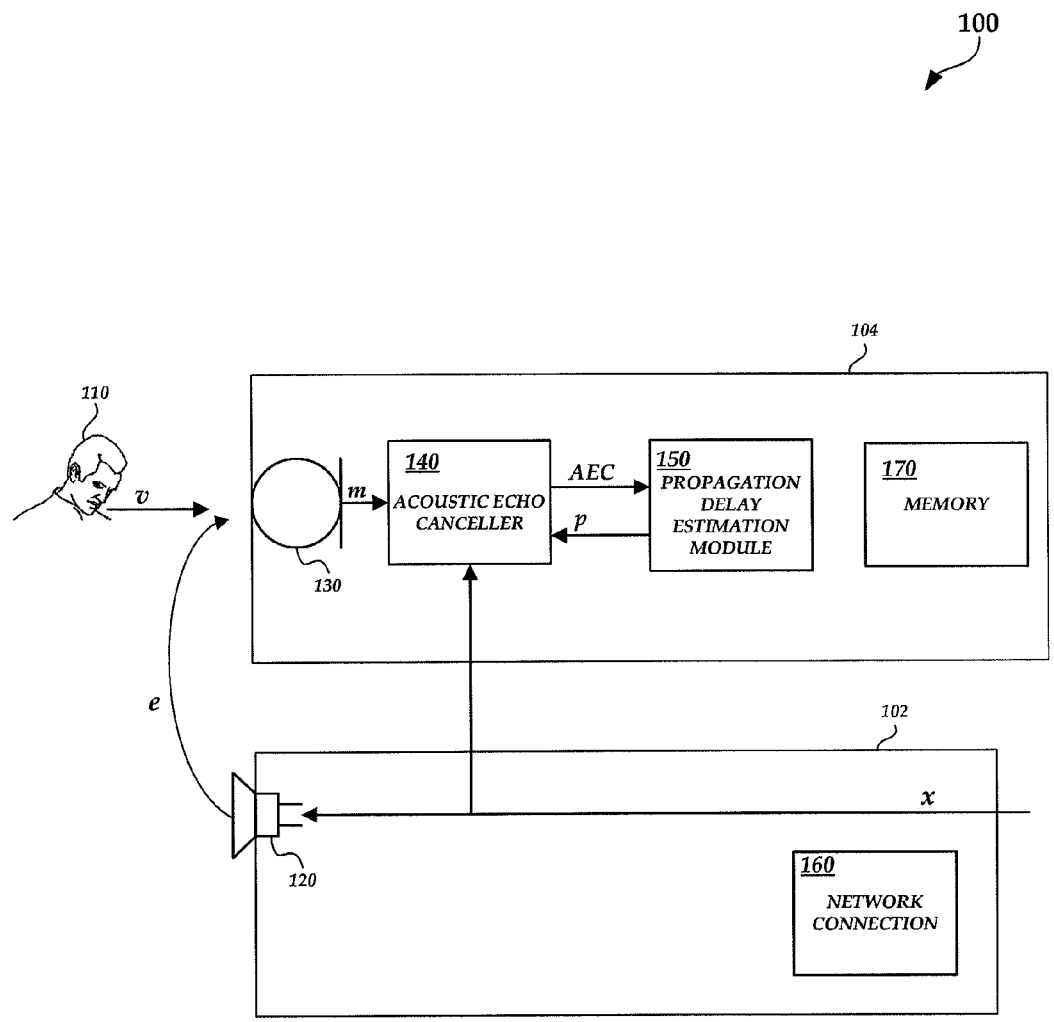
FIG. 2 is a block diagram of illustrative data flows and operations of an audio communication system according to an embodiment.

FIG. 2 is a signal diagram that illustrates the relationships between various signals and components that are relevant to acoustic echo cancellation. Certain components of FIG. 2 correspond to components from FIG. 1, and retain the same numbering. These components include the loudspeaker 120, microphone 130, acoustic echo canceller 140, propagation delay estimation module 150, network connection 160, and memory 170. The signals depicted in FIG. 2 include playback signal x, acoustic echo e, near-end signal v, microphone signal m, propagation delay parameters p, and AEC output AEC.

FIG. 2 illustrates an audio communication system 100 that includes a speaker device 102 and a microphone device 104 according to an embodiment. The speaker device 102 may comprise a speaker 120 and a network connection 160. The speaker device 102 can correspond to a wide variety of electronic devices or some combination thereof. In some embodiments, the speaker device 102 may be a computing device that includes one or more processors and a memory (not shown) which may contain software applications executed by the processors. For the sake of simplicity, microphone 130 may be referred to herein as a single component. However, in some embodiments, a microphone array may be used together and an AEC system (or portions of an AEC system) may be provided for each one.

The microphone device 104 may comprise a microphone 130, acoustic echo canceller 140, propagation delay estimation module 150, and memory 170. The microphone device 104 can correspond to a wide variety of electronic devices or some combination thereof. In some embodiments, the microphone device 104 may be a computing device that includes one or more processors and memory 170 which may contain software applications executed by the processors. For example, the acoustic echo canceller 140 and propagation delay estimation module 150 may be implemented by one or more processors running software applications executed by the processors.

Additional hardware and/or software modules or components may be included in the audio communication system 100. For example, the microphone device 104 may include an automatic speech recognition ("ASR") module (not shown) for performing speech recognition on an audio signal that corresponds to a user utterance. The microphone device 104 may also include a network communication module (not shown) for establishing communications over communication networks, or directly with other computing devices.

Illustratively, the audio communication system 100 may be (or be part of) a personal computing device, laptop computing device, hand held computing device, terminal computing device, server computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), telephone, or some other electronic device or appliance.

In the example of FIG. 2, acoustic echo may occur as follows. Playback signal x is emitted from loudspeaker 130 and undergoes various reflections in the local environment, yielding acoustic echo e. Microphone 130 captures both acoustic echo e and near-end signal v, which together produce microphone signal m. The presence of acoustic echo e in microphone signal m may interfere with the recognition of near-end signal v by a listener, thereby hindering communication. Accordingly, it may be desirable to filter microphone signal m in order to remove acoustic echo e, to the extent that such removal is possible.

In addition, a propagation delay results from a time delay between when loudspeaker 120 produces the audio playback signal and when microphone 130 first receives in the microphone signal m the acoustic echo e of the playback signal. If the acoustic echo canceller 140 is informed of the propagation delay, it can align the playback signal x with the microphone signal m before performing echo cancellation. If the acoustic echo canceller 140 is not informed of the propagation delay, or if the estimate of the propagation delay is incorrect, the acoustic echo canceller 140 will not be able to align the playback signal x with the microphone signal m, and performance of the acoustic echo canceller 140 will suffer. Furthermore, if the microphone device 104 moves relative to the speaker device 102, a previously-correct propagation delay will no longer be correct unless it is updated.

Performance of an acoustic echo canceller 140 to eliminate echo e may be measured in part by the tail length property of the acoustic echo canceller 140. In particular, the tail length of an acoustic echo canceller may specify how long an acoustic echo canceller can cancel echo e after the loudspeaker 120 has produced the playback signal x. For example, if an acoustic echo canceller has a tail length of 100 ms, and there is no propagation delay, the acoustic echo canceller could eliminate echoes received by microphone 130 up to 100 ms after being produced by loudspeaker 120, whereas the acoustic echo canceller may not be able to eliminate echoes received by microphone 130 more than 100 ms after being produced by loudspeaker 120 (e.g., echoes from a relatively-distant wall). However, if an acoustic echo canceller fails to account for the propagation delay, the effective tail length of the acoustic echo canceller may be reduced, causing performance to suffer. For example, if an acoustic echo canceller has a tail length of 100 ms, but is unaware that there is a 50 ms propagation delay, the effective tail length of the acoustic echo canceller will be reduced to 50 ms. In particular, the echo e of playback signal x would not arrive at microphone 130 until the 50 ms propagation delay, thereby wasting the initial 50 ms of the tail length of the acoustic echo canceller, and leaving only 50 ms of effective tail length to perform echo cancellation. However, if an acoustic echo canceller is aware of the 50 ms propagation delay, it could shift the received playback signal x by 50 ms to be aligned with the microphone signal m, thereby regaining the full 100 ms of tail length of the acoustic echo canceller.

In general, acoustic echo canceller 140 may be configured to perform acoustic echo cancellation on microphone signal m in the following manner. First, acoustic echo canceller 140 may be configured to receive a propagation delay parameter p from the propagation delay estimation module 150. The acoustic echo canceller 140 may be configured to shift the playback signal x by the propagation delay parameter p. The propagation delay parameter p may specify the time (e.g., in ms) that it takes between when loudspeaker 120 produces the audio playback signal x and when microphone 130 first receives in the microphone signal m the acoustic echo e of the playback signal x. Alternatively, the propagation delay parameter p may specify a number of samples to shift the playback signal x to align with the microphone signal m. Regardless of the units for the propagation delay parameter p, conversion from units of time to number of samples and vice versa may be determined based on a known sampling rate.

After adjusting playback signal x by the propagation delay parameter p, acoustic echo canceller 140 may apply an estimated transfer function $\hat{h}$ to shifted playback signal x, yielding estimated echo $\hat{y}$. Estimated echo $\hat{y}$ may be subtracted from microphone signal m, producing an echo-reduced signal AEC output AEC. AEC output AEC is an estimate of the near-end signal v, and if acoustic echo canceller 140 is functioning properly then the content of near-end signal v will be more easily discerned from AEC output AEC than from microphone signal m.

In some embodiments, the microphone device 104 may be configured to adaptively estimate the propagation delay based on the performance of the acoustic echo canceller 140 using different values of the propagation delay parameter p. For example, propagation delay estimation module 150 may be configured to send a first propagation delay parameter p to the acoustic echo canceller 140. Initially, the first propagation delay parameter p may have a value of zero. Then, the acoustic echo canceller 140 may perform a first acoustic echo cancellation on the microphone signal m using the first propagation delay parameter p to determine a first AEC output signal AEC.

To evaluate the performance of the acoustic echo canceller 140 using the first propagation delay parameter p, the propagation delay estimation module 150 may determine a first echo return loss enhancement corresponding to the first acoustic echo cancellation. The echo return loss enhancement (ERLE) generally indicates how much echo is reduced compared to the microphone signal and is a measure of the acoustic echo cancellation performance of the AEC 140. In general, a higher ERLE indicates better echo cancellation performance. To determine the first echo return loss enhancement, the propagation delay estimation module 150 may determine a microphone energy from the microphone signal m, determine an AEC output energy from the first AEC output signal AEC, and determine a ratio of the microphone energy to the AEC output energy. In addition, the propagation delay estimation module 150 may determine the first echo return loss enhancement by taking a base-10 logarithm of the ratio. For example, the echo return loss enhancement may be determined using the following equation:

$$ERLE=10*\log_{10}(\text{Power}_m/\text{Power}_{AEC})$$

Next, propagation delay estimation module 150 may be configured to send a second propagation delay parameter p to the acoustic echo canceller 140. Initially, the second propagation delay parameter p may have a value that is greater than the initial first propagation delay parameter p (e.g., zero) by a step size. The step size value may be chosen based on the accuracy to which it is desired to measure propagation delay. A smaller step size may provide for increased accuracy in measurement of propagation delay, but a smaller step size may take longer to adapt to changes in propagation delay. In some embodiments, a 10 ms step size may be used. In other embodiments, a step size between 10 and 30 ms may be used. In other embodiments, even smaller or greater step sizes may be chosen.

The acoustic echo canceller 140 may perform a second acoustic echo cancellation on the microphone signal m using the second propagation delay parameter p to determine a second AEC output signal AEC. Before performing the second acoustic cancellation, the acoustic echo canceller 140 may reset its filter coefficients of the estimated transfer function h in order to restart AEC training without influence from the first acoustic echo cancellation. Once the second acoustic echo cancellation has been performed, the propagation delay estimation module 150 may be configured to evaluate the performance of the acoustic echo canceller 140 using the second propagation delay parameter p. In particular, the propagation delay estimation module 150 may determine a second echo return loss enhancement corresponding to the second acoustic echo cancellation. To determine the second echo return loss enhancement, the propagation delay estimation module 150 may determine a microphone energy from the microphone signal m, determine an AEC output energy from the second AEC output signal AEC, and determine a ratio of the microphone energy to the second AEC output energy. In addition, the propagation delay estimation module 150 may determine the second echo return loss enhancement by taking a base-10 logarithm of the ratio. For example, the echo return loss enhancement may be determined using the following equation:

$$ERLE=10*\log_{10}(\text{Power}_m/\text{Power}_{AEC}))$$

Next, propagation delay estimation module 150 may be configured to compare the first echo return loss enhancement to the second echo return loss enhancement. In some embodiments, the propagation delay estimation module 150 may be configured to compare the first echo return loss enhancement to the second echo return loss enhancement to determine which is greater. The greater echo return loss enhancement indicates better performance of the acoustic echo canceller 140, which may indicate that the propagation delay parameter corresponding to the greater echo return loss enhancement is closer to the true value of the propagation delay than the other propagation delay parameter corresponding to the smaller echo return loss enhancement. In some embodiments, the propagation delay estimation module 150 may be configured to store in a memory 170 the greater of the first echo return loss enhancement and the second echo return loss enhancement. In addition, the propagation delay estimation module 150 may be configured to store in a memory 170 the propagation delay parameter corresponding to the greater of the first echo return loss enhancement and the second echo return loss enhancement.

The propagation delay estimation module 150 may be configured to estimate a propagation delay between the audio playback signal x and the microphone signal m based on the comparison. For example, in some embodiments, the propagation delay estimation module 150 may be configured to estimate the propagation delay as the propagation delay parameter corresponding to the greater echo return loss enhancement. In other embodiments, the propagation delay estimation module 150 may be configured to estimate the propagation delay based on the first and second propagation delay parameters. For example, if the comparison indicates equal performance (e.g., the first and second echo return loss enhancement have the same value), then the propagation delay estimation module 150 could estimate the propagation delay as the average of the first and second propagation delay parameters.

The propagation delay estimation module 150 may be configured to continuously and adaptively estimate the propagation delay parameter. For example, in some embodiments, the propagation delay estimation module 150 may be configured to determine an ERLE corresponding to each of n propagation delay parameters. The n propagation delay parameters may be spaced apart by a step size (e.g., 10 ms) up to a maximum threshold (e.g., 250 ms). In the example in which the step size is 10 ms and the maximum threshold for the propagation delay parameter is 250 ms, 26 ERLEs would be determined corresponding to each of the 26 propagation delay parameters between zero and 250 ms (0 ms, 10 ms, 20 ms, . . . , 250 ms). The propagation delay estimation module 150 may be configured to compare each of the 26 ERLEs corresponding to each of the 26 propagation delay parameters to determine the greatest of the 26 ERLEs. In addition, the propagation delay estimation module 150 may be configured to estimate a propagation delay between the audio playback signal x and the microphone signal m as the propagation delay parameter corresponding to the greatest of the 26 ERLEs. After the propagation delay estimation module 150 has estimated ERLEs for each propagation delay parameter up to the maximum threshold, the propagation delay estimation module 150 may be configured to reset the first propagation delay parameter to zero. Accordingly, by continuously repeating the process of determining the propagation delay parameter corresponding to a maximum ERLE value, the propagation delay estimation module 150 may adapt in nearly real time to changes in the propagation delay.

In some embodiments, the propagation delay estimation module 150 may be configured to continuously and adaptively update the propagation delay parameter based on the results of the previous comparison. For example, in some embodiments, the propagation delay estimation module 150 may be configured to determine a greater of the first echo return loss enhancement and the second echo return loss enhancement; determine an updated first propagation delay parameter using the propagation delay parameter corresponding to the greater of the first echo return loss enhancement and the second echo return loss enhancement; and determine an updated second propagation delay parameter by increasing the second propagation delay parameter by a step size. The process of performing acoustic echo cancellation, determining an ERLE, and comparing ERLEs may be repeated using the updated second propagation delay parameter. For example, the process may be repeated until the second propagation delay parameter reaches a maximum threshold. After the process is complete, the final value of the first propagation delay parameter may correspond to the propagation delay parameter that maximizes the ERLE. Then, the first propagation delay parameter may be reset to zero, and the process of estimating the propagation delay may continue.

Figure 3:
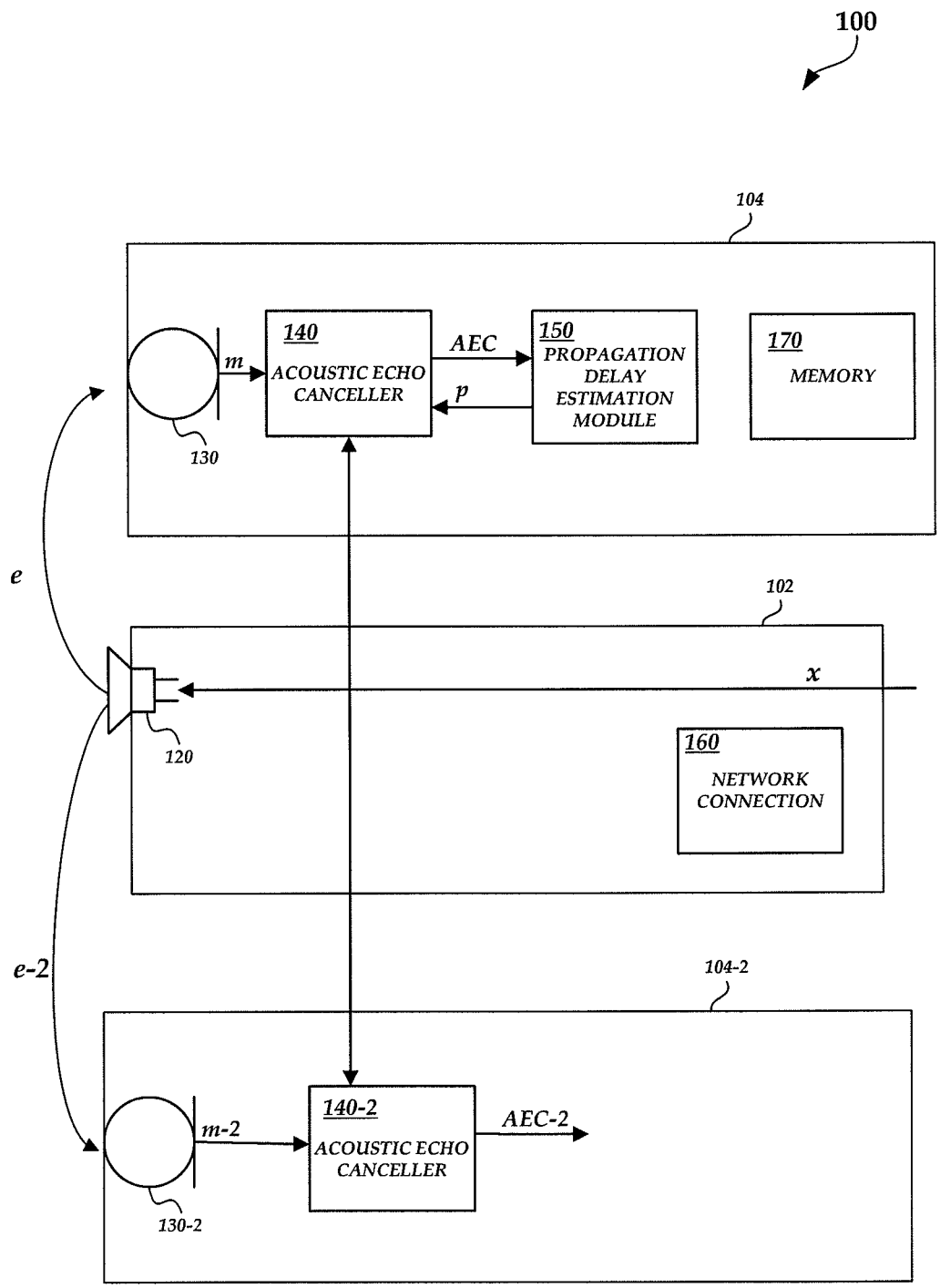
FIG. 3 is a block diagram of illustrative data flows and operations of an audio communication system according to another embodiment.

FIG. 3 is a signal diagram that illustrates the relationships between various signals and components that are relevant to acoustic echo cancellation according to another embodiment. Certain components of FIG. 3 correspond to components from FIG. 2, and retain the same numbering. These components include the loudspeaker 120, microphone 130, acoustic echo canceller 140, propagation delay estimation module 150, network connection 160, and memory 170. In addition, FIG. 3 illustrates another microphone 130-2 in microphone device 104-2. The microphone device 104-2 may be the same or a different device than microphone device 104. In some embodiments, microphones 130 and 130-2 may be part of a microphone array. Alternatively, in other embodiments, microphones 130 and 130-2 may not be part of a microphone array, and may be part of different devices. The microphone 130-2 may receive another acoustic echo e-2, which may be substantially similar to acoustic echo e.

Acoustic echo canceller 140 and propagation delay estimation module 150 may operate in the same manner as described above with respect to FIG. 2 in order to estimate propagation delay. In addition, propagation delay estimation module 150 may share the estimated propagation delay with acoustic echo canceller 140-2. Acoustic echo canceller 140-2 may perform acoustic echo cancellation on microphone signal m-2 using the estimated propagation delay to generate AEC output signal AEC-2. Also, acoustic echo canceller 140 and propagation delay estimation module 150 of microphone device 104 may be dedicated to estimating the propagation delay, whereas acoustic echo canceller 140-2 may use the estimated propagation delay to be dedicated to performing acoustic echo cancellation. Although FIG. 3 illustrates two microphones 130 and 130-2, the microphone array may comprise any number of microphones, with one microphone being dedicated to estimating propagation delay, and the other microphones being freed up to perform echo cancellation.

Process for Propagation Delay Estimation

Figure 4:
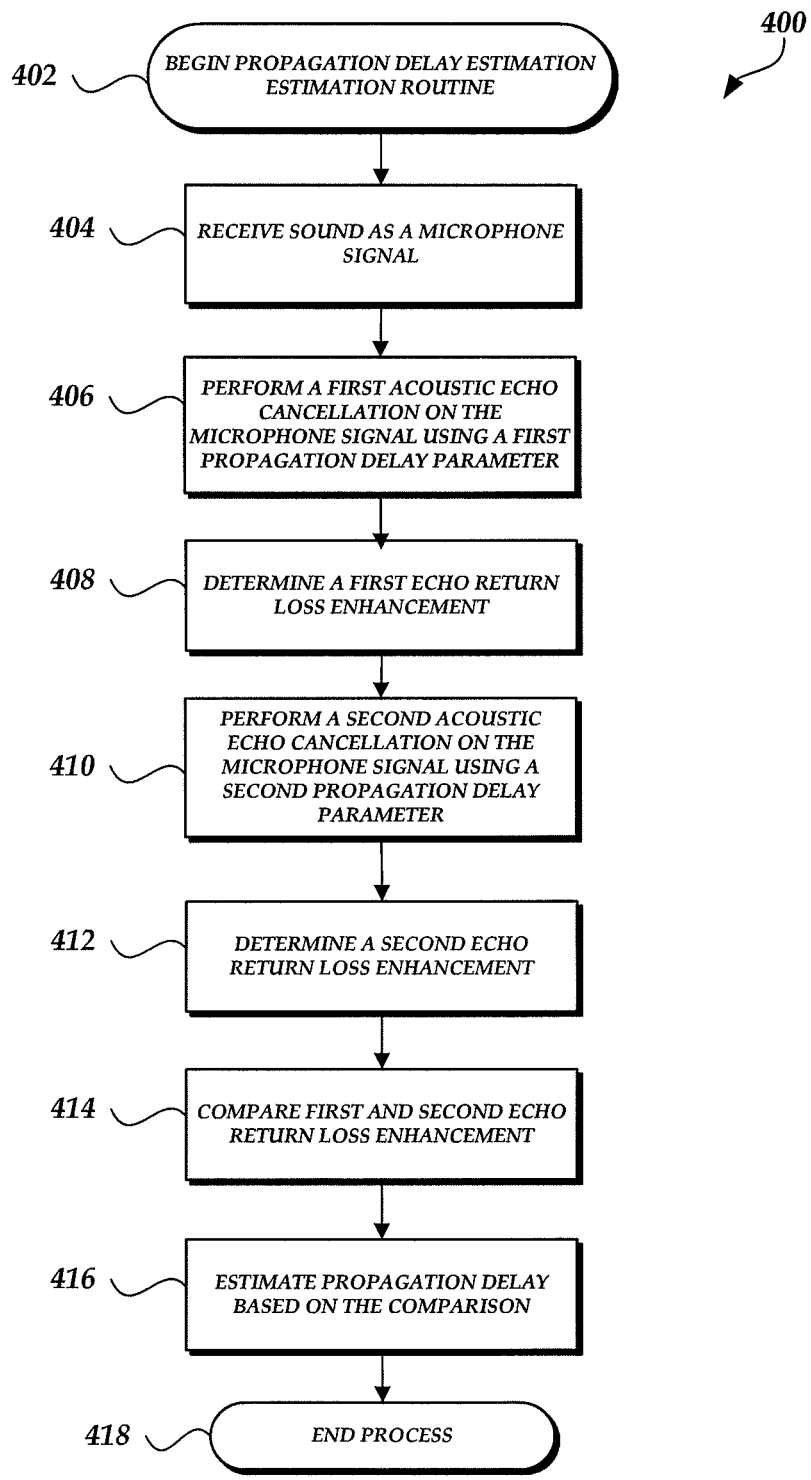
FIG. 4 is a flow diagram of an illustrative process for performing propagation delay estimation according to an embodiment.

With reference now to FIG. 4, an example process 400 for adaptively estimating propagation delay according to an embodiment will be described. The process 400 begins at block 402. The process 400 may be embodied in hardware, a set of executable program instructions, or a combination of hardware and executable program instructions. The process 400 may be performed, for example, by the propagation delay estimation module 150 of the microphone device 104 of FIGS. 2 and 3. Although the process 400 of FIG. 4 will be described with respect to the components of FIGS. 2 and 3, the process 400 is not limited to implementation by, or in conjunction with, any specific component shown in FIGS. 2 and 3. In some embodiments, the process 400, or some variant thereof, may be implemented by alternative components, by the components of FIGS. 2 and 3 in a different configuration, etc.

At block 404, sound may be received as a microphone signal. For example, the microphone 130 may receive sound as a microphone signal m, the received sound produced based on an audio playback signal x. At block 406, a first acoustic echo cancellation is performed on the microphone signal using a first propagation delay parameter. For example, the AEC 140 may perform a first acoustic echo cancellation on the microphone signal m using the first propagation delay parameter to determine a first AEC output signal.

At block 408, a first echo return loss enhancement is determined. For example, the propagation delay estimation module 150 may determine a first echo return loss enhancement corresponding to the first acoustic echo cancellation.

At block 410, a second acoustic echo cancellation is performed on the microphone signal using a second propagation delay parameter. For example, the AEC 140 may perform a second acoustic echo cancellation on the microphone signal m using the second propagation delay parameter to determine a second AEC output signal. At block 412, a second echo return loss enhancement is determined. For example, the propagation delay estimation module 150 may determine a second echo return loss enhancement corresponding to the second acoustic echo cancellation.

At block 414, the first and second echo return loss enhancement may be compared. For example, the propagation delay estimation module 150 may compare the first and second echo return loss enhancement. In particular, the propagation delay estimation module 150 may determine the greater of the first and second echo return loss enhancement.

At block 416, the propagation delay may be estimated based on the comparison. For example, the propagation delay estimation module 150 may estimate a propagation delay between the audio playback signal x and the microphone signal m based on the comparison. In particular, the propagation delay estimation module 150 may estimate the propagation delay as the propagation delay parameter corresponding to the greater of the first and second echo return loss enhancement. After the propagation delay has been estimated, the process 400 ends at block 418. However, process 400 may be continuously repeated using updated values of the first and second propagation delay parameters in order to continuously estimate the propagation delay. In addition, the estimated propagation delay may be communicated to an acoustic echo canceller to perform acoustic echo cancellation on another microphone signal from another microphone. For example, the propagation delay estimation module 150 may send the estimated propagation delay to another acoustic echo canceller 140-2 to perform acoustic echo cancellation on another microphone signal m-2 from another microphone 130-2.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a first device in communication with a speaker, the first device configured to produce sound based on an audio playback signal;

a second device in communication with one or more microphones, the second device configured to:
  detect the produced sound as a microphone signal;
  perform a first acoustic echo cancellation on the microphone signal using a first propagation delay parameter to determine a first AEC output signal;
  determine a first echo return loss enhancement corresponding to the first acoustic echo cancellation;
  perform a second acoustic echo cancellation on the microphone signal using a second propagation delay parameter to determine a second AEC output signal;
  determine a second echo return loss enhancement corresponding to the second acoustic echo cancellation;
  compare the first echo return loss enhancement to the second echo return loss enhancement; and
  estimate a propagation delay between the audio playback signal and the microphone signal as the first propagation delay parameter or the second propagation delay parameter based on the comparison.

2. The system of claim 1, wherein determining the first echo return loss enhancement comprises:
  determining a microphone energy from the microphone signal;
  determining an AEC output energy from the first AEC output signal; and
  determining a ratio of the microphone energy to the AEC output energy.

3. The system of claim 1, wherein the second device is further configured to determine the second propagation delay parameter by incrementing the first propagation delay parameter by a step size.

4. The system of claim 1, wherein the second device is further configured to send the estimated propagation delay to an acoustic echo canceller to perform acoustic echo cancellation on another microphone signal.

5. The system of claim 1, wherein the second device is further configured to:
  determine a greater of the first echo return loss enhancement and the second echo return loss enhancement;
  store in a memory the greater of the first echo return loss enhancement and the second echo return loss enhancement; and
  store in the memory the propagation delay parameter corresponding to the greater of the first echo return loss enhancement and the second echo return loss enhancement.

6. The system of claim 1, wherein the second device is further configured to:
  determine a greater of the first echo return loss enhancement and the second echo return loss enhancement;
  determine an updated first propagation delay parameter using the propagation delay parameter corresponding to the greater of the first echo return loss enhancement and the second echo return loss enhancement; and
  determine an updated second propagation delay parameter by increasing the second propagation delay parameter by a step size.

7. The system of claim 1, wherein the second device is further configured to reset the first propagation delay parameter to zero once the first or second propagation delay parameter reaches a threshold.

8. A method comprising:
  receiving a microphone signal produced based on a received sound corresponding to an audio playback signal;
  performing a first acoustic echo cancellation on the microphone signal using a first propagation delay parameter to determine a first AEC output signal;
  determining a first echo return loss enhancement corresponding to the first acoustic echo cancellation;
  performing a second acoustic echo cancellation on the microphone signal using a second propagation delay parameter to determine a second AEC output signal;
  determining a second echo return loss enhancement corresponding to the second acoustic echo cancellation;
  comparing the first echo return loss enhancement to the second echo return loss enhancement; and
  estimating a propagation delay between the audio playback signal and the microphone signal based on the comparison.

9. The method of claim 8, further comprising:
  determining a microphone energy from the microphone signal;
  determining an AEC output energy from the first AEC output signal; and
  determining the first echo return loss enhancement based on a ratio of the microphone energy to the AEC output energy.

10. The method of claim 8, further comprising determining the second propagation delay parameter by incrementing the first propagation delay parameter by a step size.

11. The method of claim 8, further comprising sending the estimated propagation delay to an acoustic echo canceller to perform acoustic echo cancellation on another microphone signal.

12. The method of claim 8, further comprising:
  determining a greater of the first echo return loss enhancement and the second echo return loss enhancement;
  storing in a memory the greater of the first echo return loss enhancement and the second echo return loss enhancement; and
  storing in the memory the propagation delay parameter corresponding to the greater of the first echo return loss enhancement and the second echo return loss enhancement.

13. The method of claim 8, further comprising:
  determining a greater of the first echo return loss enhancement and the second echo return loss enhancement;
  determining an updated first propagation delay parameter using the propagation delay parameter corresponding to the greater of the first echo return loss enhancement and the second echo return loss enhancement; and
  determining an updated second propagation delay parameter by increasing the second propagation delay parameter by a step size.

14. The method of claim 8, further comprising resetting the first propagation delay parameter to zero once the first or second propagation delay parameter reaches a threshold.

15. One or more non-transitory computer-readable storage media comprising computer-executable instructions to:
  receive a microphone signal produced based on a received sound corresponding to an audio playback signal;
  perform a first acoustic echo cancellation on the microphone signal using a first propagation delay parameter to determine a first AEC output signal;
  determine a first echo return loss enhancement corresponding to the first acoustic echo cancellation;
  perform a second acoustic echo cancellation on the microphone signal using a second propagation delay parameter to determine a second AEC output signal;
  determine a second echo return loss enhancement corresponding to the second acoustic echo cancellation;

compare the first echo return loss enhancement to the second echo return loss enhancement; and estimate a propagation delay between the audio playback signal and the microphone signal based on the comparison.

16. The one or more non-transitory computer-readable storage media of claim 15, further comprising computer-executable instructions to:

determine a microphone energy from the microphone signal;

determine an AEC output energy from the first AEC output signal; and determine the first echo return loss enhancement based on a ratio of the microphone energy to the AEC output energy.

17. The one or more non-transitory computer-readable storage media of claim 15, further comprising computer-executable instructions to determine the second propagation delay parameter by incrementing the first propagation delay parameter by a step size.

18. The one or more non-transitory computer-readable storage media of claim 15, further comprising computer-executable instructions to send the estimated propagation delay to an acoustic echo canceller to perform acoustic echo cancellation on another microphone signal.

19. The one or more non-transitory computer-readable storage media of claim 15, further comprising computer-executable instructions to:

determine a greater of the first echo return loss enhancement and the second echo return loss enhancement;

store in a memory the greater of the first echo return loss enhancement and the second echo return loss enhancement; and store in the memory the propagation delay parameter corresponding to the greater of the first echo return loss enhancement and the second echo return loss enhancement.

20. The one or more non-transitory computer-readable storage media of claim 15, further comprising computer-executable instructions to reset the first propagation delay parameter to zero once the first or second propagation delay parameter reaches a threshold.

* * * * *